(12) United States Patent
Nilsson

(10) Patent No.: US 7,837,278 B2
(45) Date of Patent: Nov. 23, 2010

(54) REDUNDANT BRAKE ACTUATORS FOR FAIL SAFE BRAKE SYSTEM

(75) Inventor: Peter Nilsson, Orkelljunga (SE)

(73) Assignee: Haldex Brake Products AB (SE)

( * ) Notice: Subject to any disclaimer, the term of this patent is extended or adjusted under 35 U.S.C. 154(b) by 767 days.

(21) Appl. No.: 11/755,282

(22) Filed: May 30, 2007

(65) Prior Publication Data

US 2008/0296106 A1 Dec. 4, 2008

(51) Int. Cl.
*B60T 13/74* (2006.01)
*B60L 7/00* (2006.01)

(52) U.S. Cl. .......................................... 303/20; 188/158

(58) Field of Classification Search ................ 188/72.2, 188/72.3, 156, 157, 158, 161, 162; 303/20
See application file for complete search history.

(56) References Cited

U.S. PATENT DOCUMENTS

| | | | |
|---|---|---|---|
| 4,653,614 A | 3/1987 | Price et al. | |
| 4,852,699 A | 8/1989 | Karnopp et al. | |
| 4,946,007 A | 8/1990 | Pederson et al. | |
| 4,974,704 A | 12/1990 | Miller et al. | |
| 5,012,901 A | 5/1991 | Campbell et al. | |
| 5,788,023 A | 8/1998 | Schöner et al. | |
| 5,829,557 A | 11/1998 | Halasy-Wimmer et al. | |
| 5,961,190 A * | 10/1999 | Brandmeier et al. ........... 303/20 |
| 7,143,873 B2 * | 12/2006 | Pascucci et al. ............. 188/72.2 |
| 2005/0127749 A1 | 6/2005 | Hartmann et al. | |
| 2005/0165531 A1 * | 7/2005 | Nilsson et al. ................ 701/70 |
| 2006/0175163 A1 * | 8/2006 | Severinsson ............... 188/72.2 |

FOREIGN PATENT DOCUMENTS

WO WO 2005030522 A2 * 4/2005

* cited by examiner

*Primary Examiner*—Thomas J Williams
(74) *Attorney, Agent, or Firm*—St. Onge Steward Johnston & Reens LLC

(57) ABSTRACT

A vehicle brake system includes first and second central control units communicating with, respectively, first and second control networks, and a plurality of brake units. Each brake unit includes a brake component, a self-enforcing mechanism associated with and acting upon the brake component, and first and second actuation mechanisms acting upon the self enforcing mechanism, in response to, respectively, first and second actuation control signals, to cause actuation of the brake component. Each brake unit also includes first and second local control units in direct communication with, respectively, the first and second central control units via, respectively, the first and second control networks. The first and second local control units are in communication with, respectively, the first and second actuation mechanisms and transmit, respectively, the first and second actuation control signals to, respectively, the first and second actuation mechanisms, under certain circumstances, to cause actuation of the brake component.

31 Claims, 11 Drawing Sheets

# REDUNDANT BRAKE ACTUATORS FOR FAIL SAFE BRAKE SYSTEM

FIELD OF THE INVENTION

The present invention relates generally to a system for controlling the application of a brake of a vehicle, which is particularly well-suited for controlling the application of an electromechanical brake with self-enforcing characteristics, and more specifically to a redundant brake actuator for use in connection with such a system to provide fail safe operation.

BACKGROUND OF THE INVENTION

Electromechanical brakes have been known for some time. U.S. Pat. No. 5,788,023 discloses a disc brake for a vehicle which can be actuated electrically and whose brake linings can be pressed against the brake disc with the aid of an electric motor. The electric motor transmits its actuation force, via a so-called planetary rolling-contact threaded spindle, onto an axially displaceably mounted piston which interacts with the brake lining.

U.S. Pat. No. 5,829,557 discloses another vehicle disc brake which can be actuated electrically and whose brake linings can in turn be pressed against the brake disc by means of an electric motor serving as an actuator. The electric motor comprises a spindle gear mechanism and, by means of a spindle element which can be of different designs, is connected, in the direction of displacement of the brake linings, to an axially displaceable piston which acts on a brake lining. In this patent, there is optional provision for the use of an additional gear mechanism for converting the torque and rotational speed.

A major problem with conventional brakes with an electric actuator is the high actuator force that has to be applied in order to achieve a sufficient braking effect. The necessary high actuator force and the resulting large power demand of the actuator make it necessary to employ very large drive units, usually electric motors, which have large torques, and are also heavy and expensive. The result of this is that electromechanical brakes have, to date, not become widespread as vehicle brakes, for example.

In order to decrease the energy consumption of the brake actuators, so-called self-enforcing actuators have been proposed. Early examples of such self-enforcing brakes can be found in U.S. Pat. Nos. 4,653,614, 4,852,699, 4,946,007, 4,974,704, 5,012,901. A self-enforcing brake works according to the principle that the braking force amplifies itself. The friction force between the brake linings and the brake disc give rise, with help of a self-enforcing mechanism, to increased force against the brake linings and brake disc. This increased force gives, in turn, rise to increased friction force. Hence, it is possible to produce and control large braking forces by applying relatively moderate forces.

The degree of self-enforcement defines the relation between the applied force and the actual braking force. The self-enforcement is strongly dependent on the disc/pad friction coefficient. Normally, the variations in the disc/pad friction coefficient are large, and are dependent on, among other factors, the temperature of the disc and/or pad. Variations in disc/pad friction coefficient are even possible within one and the same brake application.

At a specific disc/pad friction coefficient, $\mu_{inf}$, the static reinforcement of the self-enforcing mechanism is principally infinity. That means that one can produce and control large brake forces by only applying relatively moderate forces. For disc/pad friction coefficients lower than this specific number, the brake is stable, which means that a pushing force has to be applied to produce brake forces. For disc/pad friction coefficients larger than $\mu_{inf}$, the self-enforced brake instead will become unstable, which means that a pulling force has to be applied to hold the brake at a specific brake force or else uncontrolled braking (i.e., lockup) can occur.

Thus, it should be recognized that while proper control of all electromechanical brake actuators is important, proper and accurate control at all times of self-enforcing brake actuators is even more critical so as to avoid uncontrolled braking with possibly catastrophic results.

One of the ways in which failure can occur in such systems is if there is a failure within the control network that controls actuation of the brake actuators, or within the brake actuators themselves. In order to deal with such situations, and in attempts to provide a fail safe brake system, it has been proposed to provide redundancy in certain aspects of the braking system.

U.S. Published Patent Application No. US 2005/0127749 A1 (hereinafter referred to as "the '749 application") discloses such a system, in which is provided at least one central control unit (72) and a control means (84) associated with each braking module (66). Each control means (84) includes a main control unit (80) which is in communication with the central control unit (72) and with the various system sensors, and an auxiliary control unit (82) which is in communication with the main control unit (80). The main control unit (80) controls operation of drives (34, 34') of the self-enforcing brake (10), while the auxiliary control unit (82) controls operation of an adjusting means (42) of the self-enforcing brake (10).

While the system disclosed in the '749 application does provide for some separation of control duties between the main control unit (80) and the auxiliary control unit (82), and does provide for some redundancy in certain respects, it does not provide true redundancy of brake actuation and suffers from serious disadvantages. One of such disadvantages is that only the main control unit (80) is in direct communication with the central control unit (72) and with the various system sensors; the auxiliary control unit (82) communicates with these elements only through the main control unit (80). Thus, in the event that the main control unit (80) ceases to function properly (due to a power failure, a short, physical damage, or for any of a number of other reasons), the auxiliary control unit (82) may be isolated from the central control unit (72) and the various system sensors, thereby severely restricting operation of the auxiliary control unit (82), or even rendering the auxiliary control unit (82) essentially useless.

Another disadvantage of the system described in the '749 application is that the auxiliary control unit (82) is capable of only very limited brake actuation, even when the auxiliary control unit (82) is fully functional. True brake actuation control capability is not provided. Instead, again assuming that the main control unit (80) ceases to function properly (due to a power failure, a short, physical damage, or for any of a number of other reasons) and is no longer able to properly control drives (34, 34'), the auxiliary control unit (82) allows only for control of the adjusting means (42). As the '749 application itself recognizes, this provides only very limited control of the self-enforcing brake (10), permitting an open brake to remain open, and possibly permitting a closed brake to be caused to open. The auxiliary control unit (82) can not be used to control adjusting means (42) such that the self-enforcing brake is caused to be placed or remain under load, or there would exist the very real possibility of uncontrolled braking (i.e., lockup) due to the nature of the self-enforcing brake (10).

What is desired, therefore, is a system for controlling application of an electronically controlled brake which is well-suited for controlling the application of an electromechanical brake unit with self-energizing characteristics, which includes a redundant brake actuator for providing fail safe operation, which provides redundant communication with at least one central control unit and system sensors such that a functioning portion of the brake actuator is still in communication with these elements even during failure of another portion of the brake actuator, and which allows for a functioning portion of the brake actuator to provide at least a level of brake actuator control sufficient to avoid catastrophic consequences even during failure of another portion of the brake actuator.

SUMMARY OF THE INVENTION

Accordingly, it is an object of the present invention to provide a system for controlling application of an electronically controlled brake which is well-suited for controlling the application of an electromechanical brake unit with self-energizing characteristics.

Another object of the present invention is to provide a system for controlling application of an electronically controlled brake having the above characteristics and which includes a redundant brake actuator for providing fail safe operation and high availability of the vehicle.

A further object of the present invention is to provide a system for controlling application of an electronically controlled brake having the above characteristics and which provides redundant communication with at least one central control unit and system sensors such that a functioning portion of the brake actuator is still in communication with these elements even during failure of another portion of the brake actuator.

Still another object of the present invention is to provide a system for controlling application of an electronically controlled brake having the above characteristics and which allows for a functioning portion of the brake actuator to provide at least a level of brake actuator control sufficient to avoid catastrophic consequences even during failure of another portion of the brake actuator.

These and other objects of the present invention are achieved in accordance with one embodiment of the present invention by provision of a vehicle brake system which includes a first power supply supplying electrical power to a first power supply network, a second power supply supplying electrical power to a second power supply network, a first central control unit in communication with a first control network, the first central control unit receiving electrical power from the first power supply network, a second central control unit in communication with a second control network, the second central control unit receiving electrical power from the second power supply network, and a plurality of brake units. Each of the plurality of brake units includes a brake component, a self-enforcing mechanism associated with and acting upon the brake component, a first actuation mechanism acting upon the self enforcing mechanism, in response to a first actuation control signal, to cause actuation of the brake component, and a second actuation mechanism acting upon the self enforcing mechanism, in response to a second actuation control signal, to cause actuation of the brake component. Each brake unit also includes a first local control unit in direct communication with the first central control unit via the first control network and receiving power from the first power supply network, and a second local control unit in direct communication with the second central control unit via the second control network and receiving power from the second power supply network. The first local control unit is in communication with the first actuation mechanism and transmits the first actuation control signal to the first actuation mechanism, under certain circumstances, to cause actuation of the brake component. The second local control unit is in communication with the second actuation mechanism and transmits the second actuation control signal to the second actuation mechanism, under certain circumstances, to cause actuation of the brake component.

In some embodiments, the first actuation mechanism is supplied power by the first power supply network and the second actuation mechanism is supplied power by the second power supply network. In some embodiments, each of the plurality of brake units further includes a first sensor in communication with the first local control unit, the first sensor sensing at least one wheel parameter and supplying a signal indicative of the at least one wheel parameter to the first local control unit, and a second sensor in communication with the second local control unit, the second sensor sensing at least one wheel parameter and supplying a signal indicative of the at least one wheel parameter to the second local control unit. In certain of these embodiments, the at least one wheel parameter comprises at least one of position of a brake component, brake force, brake torque, pad wear, wheel speed, bearing temperature, torque and tire pressure.

In some embodiments, the first local control unit and the second local control unit of each of the plurality of brake units are in communication. In some embodiments, at least one of the first local control unit and the second local control unit of at least one of the plurality of brake units is in communication with at least one of the first local control unit and the second local control unit of at least one other of the plurality of brake units. In some embodiments, the first power supply network and the second power supply network are in communication via an isolation mechanism, the isolation mechanism preventing a failure in one of the first power supply network and the second power supply network from deleteriously affecting the other of the first power supply network and the second power supply network. In certain of these embodiments, the isolation mechanism comprises a fuse.

In some embodiments, the first local control unit and the second local control unit of each of the plurality of brake units are electrically, thermally and mechanically separated from one another so as to prevent a failure in one of the first local control unit and the second local control unit from deleteriously affecting the other of the first local control unit and the second local control unit. In some embodiments, each first local control unit and each second local control unit include a mode control module that transmits an actuation enable signal which causes the actuation mechanism with which that control unit is in communication to be enabled, and an actuation control module that transmits an actuation control signal which causes the actuation mechanism with which that control unit is in communication to be actuated. In certain of these embodiments, each actuation mechanism actuates only if it is receiving the actuation enable signal when it receives the actuation control signal.

In some embodiments, the first actuation mechanism comprises a first motor and the second actuation mechanism comprises a second motor. In some embodiments, the first actuation mechanism comprises a first motor winding and the second actuation mechanism comprises a second motor winding, the first motor winding and the second motor winding acting on a common rotor and stator. In some embodiments, the first actuation mechanism comprises a first motor and the second actuation mechanism comprises a second motor and a mechanical spring. In certain of these embodiments, the mechanical spring biases the brake component toward a released position, and the brake component is moveable against the bias of the mechanical spring toward an applied position by the second motor. In certain embodiments, the mechanical spring biases the brake component toward an applied position, and the brake component is moveable against the bias of the mechanical spring toward a released position by the second motor.

In some embodiments, the first control network and the second control network comprise time division multiplexed communications networks. In certain of these embodiments, the first control network and the second control network comprise FlexRay™ automotive communications protocol networks. In some embodiments, the first central control unit and said second central control unit each comprise a plurality of local control units communicating over two independent networks.

In accordance with another embodiment of the present invention, a brake unit for use in a vehicle brake system includes a brake component, a self-enforcing mechanism associated with and acting upon the brake component, a first actuation mechanism, the first actuation mechanism acting upon the self enforcing mechanism, in response to a first actuation control signal, to cause actuation of the brake component, and a second actuation mechanism, the second actuation mechanism acting upon the self enforcing mechanism, in response to a second actuation control signal, to cause actuation of the brake component. The brake unit also includes a first local control unit in communication with the first actuation mechanism and transmitting the first actuation control signal to the first actuation mechanism, under certain circumstances, to cause actuation of the brake component, and a second local control unit in communication with the second actuation mechanism and transmitting the second actuation control signal to the second actuation mechanism, under certain circumstances, to cause actuation of the brake component. The first actuation mechanism is operable, in the case of a failure, independently of the second actuation mechanism, to cause the brake component to be applied and to be released, in response to the first actuation control signal, and the second actuation mechanism is operable, in the case of a failure, independently of the first actuation mechanism, to cause the brake component to be applied and to be released, in response to the second actuation control signal.

In some embodiments, the brake unit further includes a first sensor in communication with the first local control unit, the first sensor sensing at least one wheel parameter and supplying a signal indicative of the at least one wheel parameter to the first local control unit, and a second sensor in communication with the second local control unit, the second sensor sensing at least one wheel parameter and supplying a signal indicative of the at least one wheel parameter to the second local control unit. In certain of these embodiments, the at least one wheel parameter comprises at least one of position of a brake component, brake force, brake torque, pad wear, wheel speed, bearing temperature, torque and tire pressure.

In some embodiments, the first local control unit and the second local control unit are in communication. In some embodiments, the first local control unit and the second local control unit are electrically, thermally and mechanically separated from one another so as to prevent a failure in one of the first local control unit and the second local control unit from deleteriously affecting the other of the first local control unit and the second local control unit.

In some embodiments, each of the first local control unit and the second local control unit include a mode control module that transmits an actuation enable signal which causes the actuation mechanism with which that control unit is in communication to be enabled, and an actuation control module that transmits an actuation control signal which causes the actuation mechanism with which that control unit is in communication to be actuated. In certain of these embodiments, each actuation mechanism actuates only if it is receiving the actuation enable signal when it receives the actuation control signal.

In some embodiments, the first actuation mechanism comprises a first motor and the second actuation mechanism comprises a second motor. In some embodiments, the first actuation mechanism comprises a first motor winding and the second actuation mechanism comprises a second motor winding, the first motor winding and the second motor winding acting on a common rotor and stator. In some embodiments, the first actuation mechanism comprises a first motor and the second actuation mechanism comprises a second motor and a mechanical spring. In certain of these embodiments, the mechanical spring biases the brake component toward a released position, and the brake component is moveable against the bias of the mechanical spring toward an applied position by the second motor. In certain embodiments, the mechanical spring biases the brake component toward an applied position, and the brake component is moveable against the bias of the mechanical spring toward a released position by the second motor.

In some embodiments, the first control network and the second control network comprise time division multiplexed communications networks. In certain of these embodiments, the first control network and the second control network comprise FlexRay™ automotive communications protocol networks.

The invention and its particular features and advantages will become more apparent from the following detailed description considered with reference to the accompanying drawings.

DETAILED DESCRIPTION OF AN EMBODIMENT OF THE INVENTION

Figure 1:
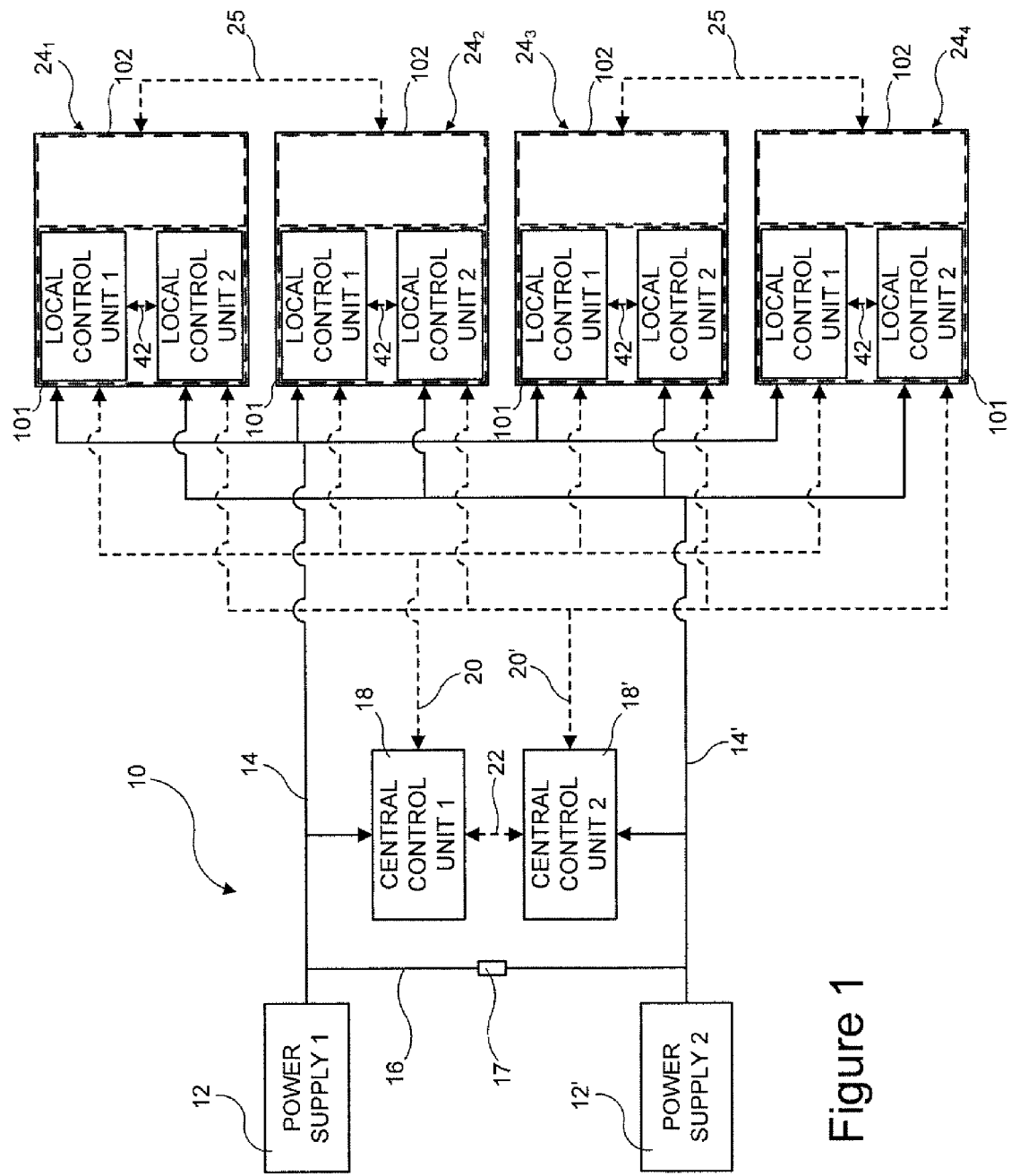
FIG. 1 is a schematic view of a brake system incorporating a system based upon a low capacity network, such as a CAN network, for controlling the application of a brake of a vehicle in accordance with an exemplary embodiment of the present invention.

Referring first to FIG. 1, a vehicle brake system 10 in accordance with an exemplary embodiment of the present invention is shown. System 10 may be employed in any of numerous types of vehicles, although it should be noted that system 10 is particularly well-suited for use in heavy vehicles. It should also be noted that, in FIGS. 1-3 and 7, electrical power supply links are shown using solid lines, while communications links are shown using dashed lines.

System 10 includes at least a first power supply 12 supplying electrical power to a first power supply network 14 and a second power supply 12' supplying electrical power to a second power supply network 14'. Preferably, although not necessarily, first and second power supply networks 14, 14' are in communication via a link 16 so as to provide for power supply redundancy in first and second power supply networks 14, 14' should one of first or second power supplies 12, 12' fail. It is also preferable that an isolation mechanism 17 be disposed within link 16 so as to prevent a failure (e.g., a short) in one of the first or second power supply networks 14, 14' from deleteriously affecting the other power supply network 14, 14'. Isolation mechanism 17 may, for example, take the form of one or more fuses.

First and second power supplies 12, 12' may take the form of two batteries charged from at least one generator, two generators, one battery and one generator or other combinations of batteries, generators and/or various other types of power supplies. If desired, more than two power supplies 12, 12' and/or more than two power supply networks 14, 14' may be provided for even further redundancy.

System 10 also includes at least a first central control unit 18 in communication with a first control network 20 and a second central control unit 18' in communication with a second control network 20'. Preferably, although not necessarily, first and second central control units 18, 18' are in communication with each other via a communications link 22 such that central control units 18, 18' can monitor the status of each other and identify potential failures. First and second central control units 18, 18' are preferably redundant, providing identical control signals via first and second control networks 20, 20', respectively. First central control unit 18 receives electrical power from first power supply network 14, while second central control unit 18' receives electrical power from second power supply network 14', again for purposes of redundancy in the case of failure of one of power supply networks 14, 14'. Since vehicle brake systems having central control units communicating via control networks are very well known in the art, the detailed configuration and operation of first and second central control units 18, 18' and of first and second control networks 20, 20' is not described herein.

System 10 also includes a plurality of brake units 24, each of which comprises an electrical control part 101 and an electromechanical actuation part 102, as described more fully below. Each brake unit 24 receives power from both of first and second power supplies 12, 12' via first and second power supply networks 14, 14', and each of which is in communication with both of first and second central control units 18, 18' via first and second control networks 20, 20', as is described more fully below. The number of brake units 24 that system 10 contains may be varied, so long as that number is sufficient enough to brake the vehicle in accordance with vehicle requirements. In a typical case, one brake unit 24 is provided per wheel of the vehicle. In FIG. 1, four brake units $24_1, 24_2, 24_3, 24_4$ are shown, although one skilled in the art could easily modify system 10 to operate with a fewer or greater number of brake units 24.

Preferably, each brake unit 24 is in communication with at least one other brake unit 24 via a communications link 25 so as to provide even further communications redundancy as described in more detail below. As shown in FIG. 1, first brake unit $24_1$ is in communication with second brake unit $24_2$, while third brake unit $24_3$ is in communication with fourth brake unit $24_4$. Preferably, the brake units 24 in communication with each other are associated with wheels disposed on the same vehicle axle. Thus, in the configuration shown in FIG. 1, first brake unit $24_1$ and second brake unit $24_2$ may be associated with wheels disposed on one vehicle axle, while third brake unit $24_3$ and fourth brake unit $24_4$ may be associated with wheels disposed on another vehicle axle.

Due to the redundant nature of the first and second power supply networks 14, 14' and of the first and second control networks 20, 20', loss of power and communication is prevented for any single failure in one of the control networks 14,14', in one of the power supply networks 20, 20' or in one or more of the brake units 24. Such a redundancy could be achieved in many different ways but has to be supported by a certain degree of redundancy in the brake units 24 to be a fail safe system. Several exemplary configurations for redundant brake units 24 will now be described with reference to FIGS. 2A-2C.

Each brake unit 24 includes a brake component 26 (i.e., brake applicator) with a self-enforcing mechanism 28 associated with and acting upon brake component 26. Numerous brake components with associated self-enforcing mechanisms are notoriously well-known in the art (with several of the patents listed in the Background of the Invention section above being exemplary thereof). As such, the configuration and operation of brake component 26 and self-enforcing mechanism 28 is not described in detail herein.

Figure 2A:
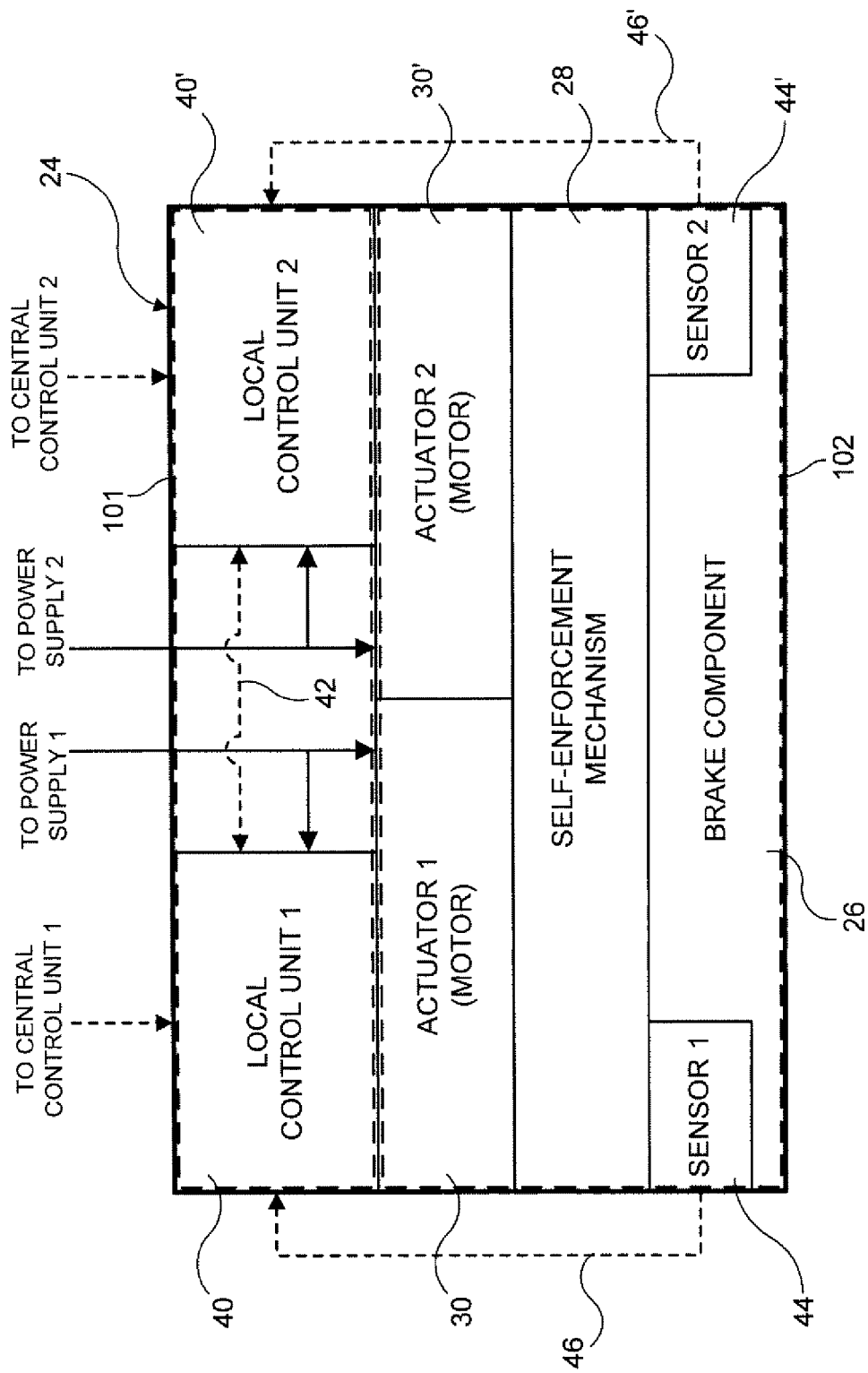
FIGS. 2A-2C are schematic views of various exemplary embodiments of brake units incorporating redundant brake actuators that may be used in connection with the system of FIG. 1.
Figure 2B:
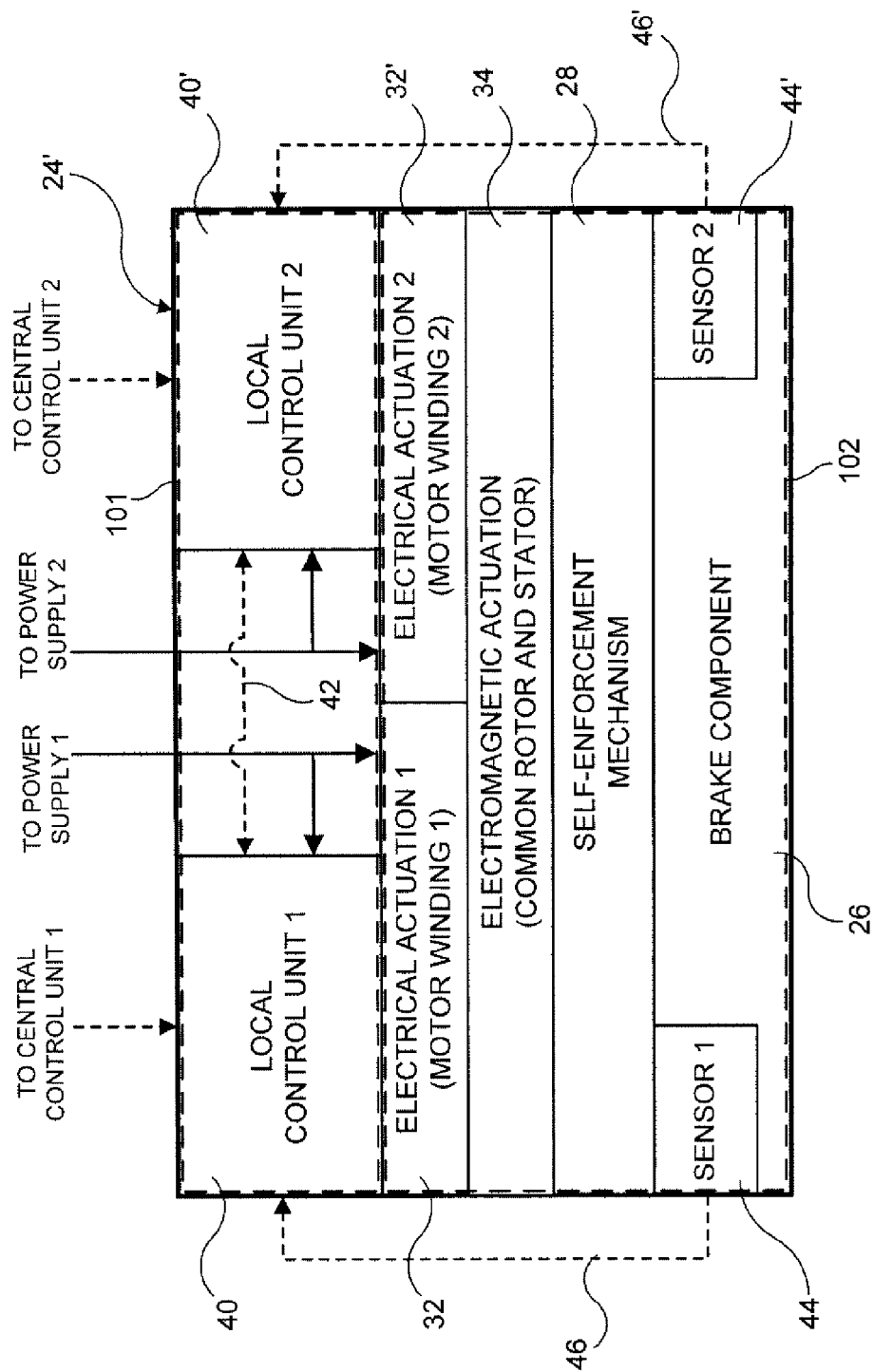

Each brake unit 24 also includes a first actuation mechanism acting upon the self enforcing mechanism 28, in response to a first actuation control signal, to cause actuation of the brake component 26, and a second actuation mechanism acting upon the self enforcing mechanism 28, in response to a second actuation control signal, to cause actuation of the brake component 26. First and second actuation mechanisms may be of the same type, and may comprise, for example, a first motor 30 and a second motor 30' (as shown in FIG. 2A), or a first motor winding 32 and a second motor winding 32' acting on a common rotor and stator 34 (as shown in FIG. 2B). It should be understood that the brake unit may comprise more than one actuator, and that the dual winding concept shown in FIG. 2B may be employed for one of more of these actuators. For example, in an electro-mechanical brake, a dual winding motor may be employed along with an electromagnet for parking lock functionality, while in a pneumatic unit, a number of electromagnet valves with the dual winding feature may be employed. Many other configurations are, of course, possible.

Alternately, first and second actuation mechanisms may be different from one another. For example, first actuation mechanism may comprises a first motor 36, while second actuation mechanism may comprise an emergency on/off (apply/release) mechanism 38, such as a second motor and a mechanical spring. Emergency on/off mechanism 38 may be configured such that the mechanical spring biases brake component 26 toward a released position, with brake component 26 being moveable against the bias of the mechanical spring toward an applied position by the second motor. Alternately, emergency on/off mechanism 38 may be configured such that the mechanical spring biases brake component 26 toward an applied position, with brake component 26 being moveable against the bias of the mechanical spring toward a released position by the second motor.

Figure 2C:
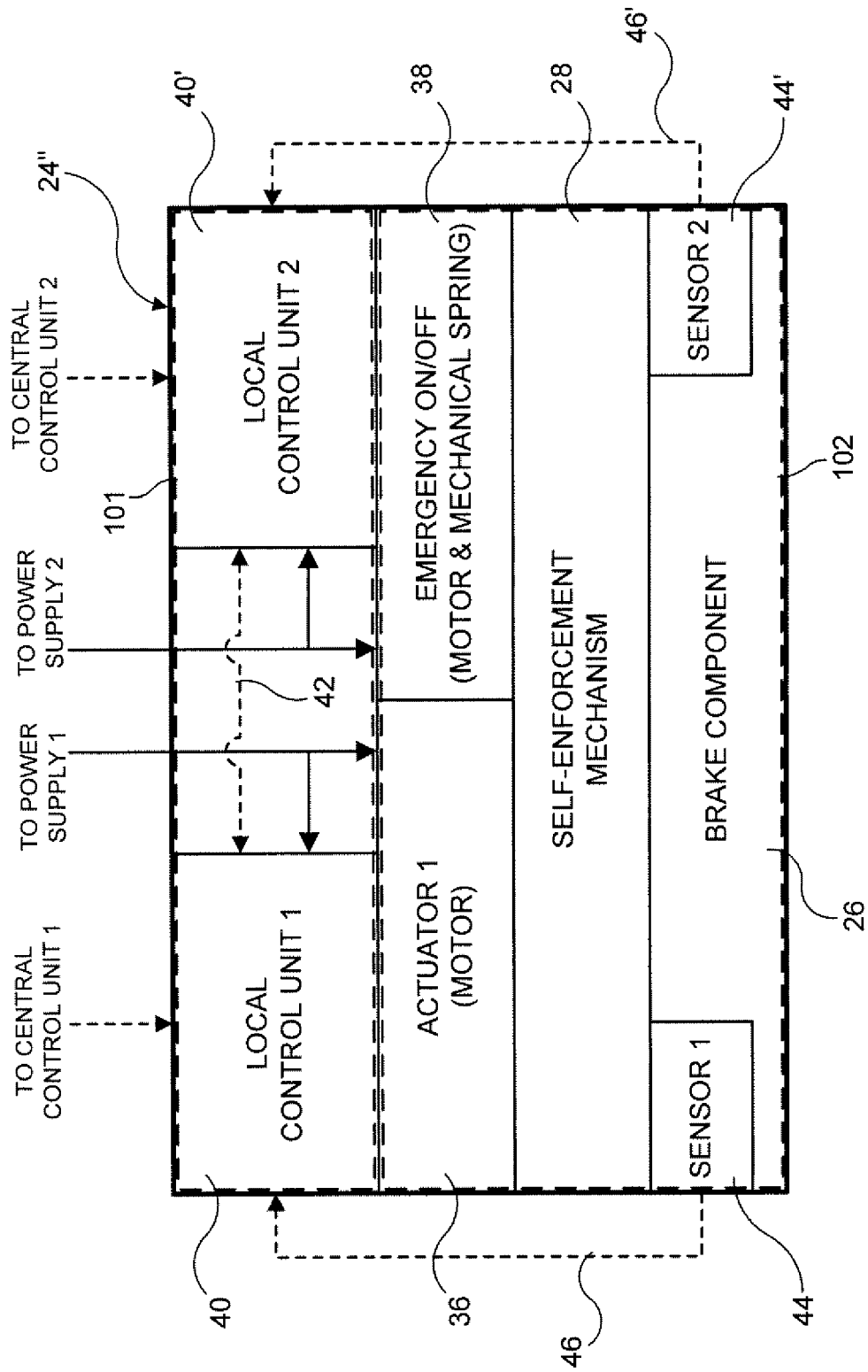

As shown in FIGS. 2A-2C, the first actuation mechanism is supplied power by first power supply network 14 and the second actuation mechanism is supplied power by second power supply network 14' for redundancy. It should be understood, based upon the above description, that the first actuation mechanism is operable, independently of the second actuation mechanism, to cause brake component 26 to be applied and to be released, in response to the first actuation control signal (described more fully below), and that the second actuation mechanism is operable, independently of the first actuation mechanism, to cause brake component 26 to be applied and to be released, in response to the second actuation control signal (described more fully below).

Each brake unit also includes a first local control unit 40 in direct communication with first central control unit 18 via first control network 20, and second local control unit 40' in direct communication with second central control unit 18' via second control network 20'. For the sake of redundancy, first local control unit 40 receives power from first power supply network 14, while second local control unit 40' receives power from second power supply network 14'. First local control unit 40 is in communication with the first actuation mechanism and transmits the first actuation control signal to the first actuation mechanism, under certain circumstances (as described more fully below), to cause actuation of brake component 26. Similarly, second local control unit 40' is in communication with the second actuation mechanism and transmits the second actuation control signal to the second actuation mechanism, under certain circumstances (again as described more fully below), to cause actuation of brake component 26.

Preferably, first local control unit 40 and second local control unit 40' of each of the brake unit 24 are in communication via a communications link 42. As mentioned above, it is also preferable that at least one of first local control unit 40 and second local control unit 40' of at least one brake unit 24 is in communication with at least one of first local control unit 40 and second local control unit 40' of at least one other brake unit 24 via communications link 25 (shown in FIG. 1).

First local control unit 40 and second local control unit 40' are preferably electrically, thermally and mechanically separated from one another so as to prevent a failure in one of first and second local control units 40, 40' from deleteriously affecting the other of first and second local control units 40, 40'. Thus, communications link 42 between first and second local control units 40, 40' is configured so as to prevent any electrical failure in one of first and second local control units 40, 40' from having any effect on the other local control unit.

Each brake unit 24 further includes a first sensor 44 in communication with first local control unit 40 via a connection 46, and a second sensor 44' in communication with second local control unit 40' via a connection 46'. Connections 46, 46' can comprise any type of connection for transmitting a signal, such as an analog signal, a digital signal, a serial communication signal, a pulse-width modulated signal, etc. First and second sensors 44, 44' sense at least one wheel parameter and supply signals indicative of the at least one wheel parameter to first local control unit 40 and second local control unit 40', respectively, via connection 46 and connection 46', respectively. First and second sensors 44, 44' supply information sufficient for the control and monitoring (diagnosis) of the functions of first and second local control units 40, 40', and may be internal in brake unit 24 and/or external to brake unit 24. Examples of internal sensors include position sensors, brake force sensors, brake torque sensors and pad wear sensors. Examples of external sensors include wheel speed sensors, bearing temperature sensors, torque sensors and tire pressure sensors. Any combination of these, and other, sensors may be employed in connection with each brake unit 24.

Each of first and second local control units 40, 40' includes at least one microcontroller, and each controls and monitors at least a part of the brake unit 24 functions. More specifically, each of first and second local control units 40, 40' is designed so as to monitor every vital failure of its own functionality, such that no single failure in either local control unit 40, 40' or in the actuation mechanism associated with each local control unit 40, 40' shall inhibit the other local control unit 40, 40' and/or associated brake mechanism from performing its function (fail silent operation).

Each of first and second local control units 40, 40' receives sensor information from first and second sensors 44, 44' sufficient enough to monitor the safety critical status of each brake unit 24. With the redundant control network topology described above, at least one of first and second central control units 18,18' will be informed about a safety critical status of any brake unit 24 failure. Thus, at least one of first and second central control units 18,18' will, for any single failure in brake system 10, be able to communicate the best possible demand for each brake unit 24 and also reach every brake unit 24 with this demand.

The safety critical status covers both locally irrecoverable failures and locally recoverable failures.

Examples of locally irrecoverable failures include mechanical rupture of brake parts and tire pressure loss. Locally irrecoverable failures are, to the highest possible degree, recovered on vehicle brake system level by the use of the remaining functional brake units 24 to maintain the dynamic stability of the vehicle if a local failure occurs. To be able to recover on brake system level, valid sensor and status information from each brake unit 24 is essential, which the design of the system 10 guarantees.

Locally fully or partly recoverable failures are recoverable by redundant design in first and second local control units 40, 40' and the first and second actuation mechanisms of each brake unit 24. These components are designed redundantly and recoverably so as to avoid failures that could endanger the vehicle dynamic stability and/or guarantee a high availability of the vehicle for economic reasons. Each local control unit 40, 40' and its associated actuation mechanism is able to control brake component 26 (i.e., cause to be both applied and released) with at least degraded performance, even with a total loss of functionality of the other local control unit 40, 40' and/or its associated actuation mechanism.

Figure 3:
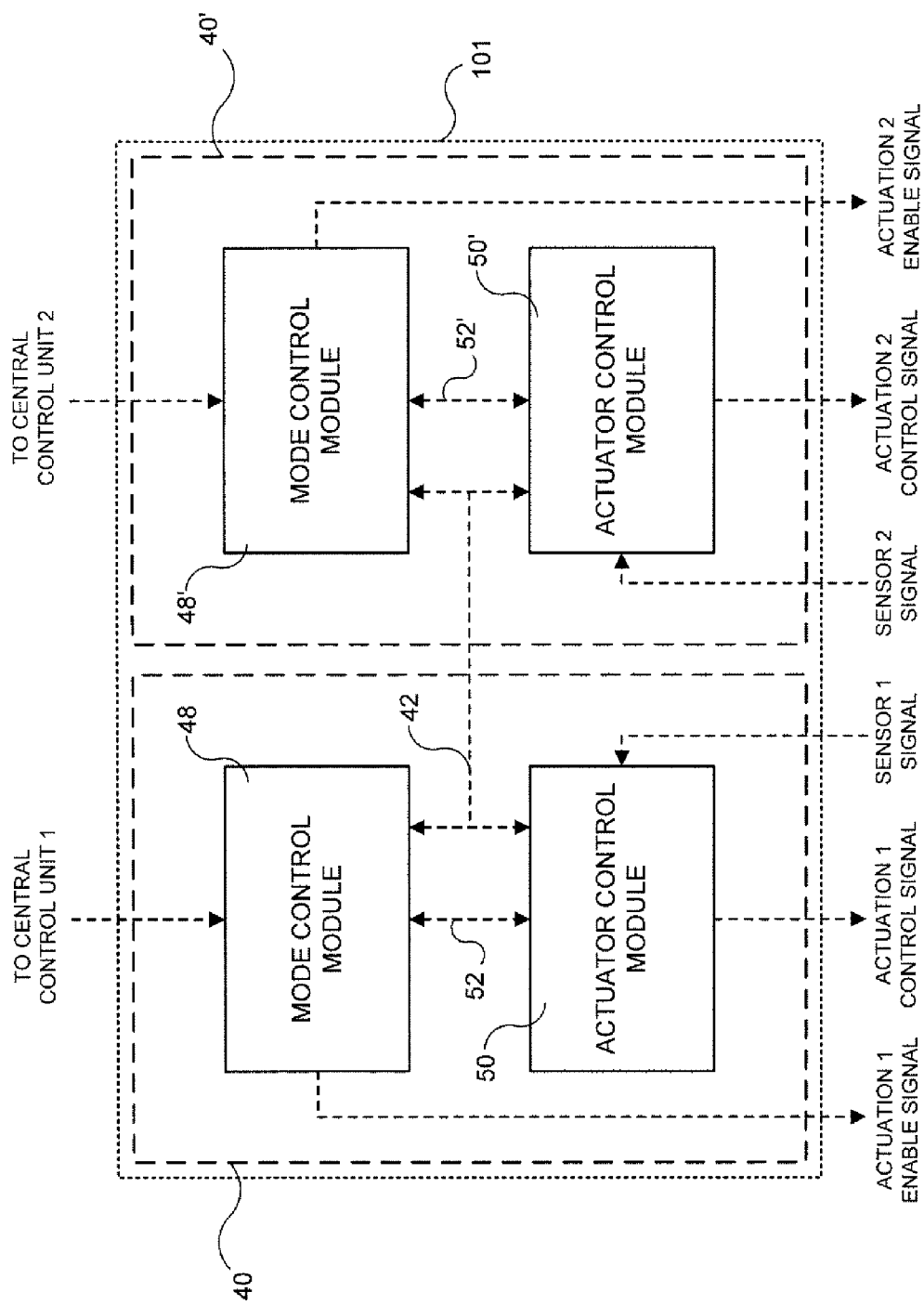
FIG. 3 is a block diagram illustrating exemplary communications to, from and within local control units forming part of the brake actuators shown in FIGS. 1 and 2A-2C.

Referring now specifically to FIG. 3, and as mentioned above, each of first and second local control units 40, 40' is mainly controlled by at least one microcontroller. The software in the microcontroller is divided into at least two main software modules, a mode control module 48, 48' and an actuator control module 50, 50'. Both mode control module 48, 48' and actuator control module 50, 50' possess at least one separate means to turn the actuation mechanism with which each local control unit 40, 40' is associated into the fail silent mode. Actuator control module 50, 50' employs the same means normally employed for control of actuation mechanisms (i.e., providing an actuation control signal). Mode control module 48, 48' employs a separate mean for enabling of the actuation mechanism. More specifically, mode control module 48, 48' preferably transmits a non-static actuation enable signal which requires the signal to be toggled by a software integrated watchdog/safety loop to enable the actuation mechanism to be "on" (i.e., ready to actuate upon receipt of the actuation control signal).

Actuator control module 50, 50' is at least responsible for controlling the actuation mechanism using the information from sensors 44, 44' connected to local control units 40, 40' and the demand for braking received from a decision software module (not shown). Since operation of actuator control and decision software are extremely well-known in the art, further detail concerning such software is not provided herein.

Mode control module 48 and actuator control module 50 of first local control unit 40 are in communication with one another, as indicated by 52, while mode control module 48' and actuator control module 50' of second local control unit 40' are in communication with one another, as indicated by 52'. Additionally, actuator control module 50, and optionally mode control module 48, of first local control unit 40 communicates through at least one internal communication link 42 with actuator control module 50', and optionally mode control module 48', of second local control unit 40' in order to synchronize the actuation of the two actuation mechanisms of each brake unit 24.

Mode control module 48, 48' is responsible for making the decision for the mode of operation for the actuation mechanism with which it is associated. The decision is made according to the information available from the brake unit sensors (i.e., both first and second sensors 44, 44' available through internal communications link 42) and the information available and received from central control units 18,18', other wheel control units and/or external vehicle sensors connected to the system control network.

The decisions in the two decision software modules in one brake unit 24 shall be identical. If internal communication link 42 is failing, or for some other reason the decision is not identical, a decision shall be made with the help of a third control unit outside the local brake unit 24. This third unit taking part in the decision can be the other brake unit 24 on the same axle of the vehicle (via communications link 25, for example) or at least one of central control units 18,18'. This additional information for the local decision software module is for example useful for a decision software module to determine if there is only an internal communication failure or if there is a partial or total failure in the other control module. Only when both communication networks are lost, a totally local decision of the modes of operation of the brake unit is made.

Figure 4:
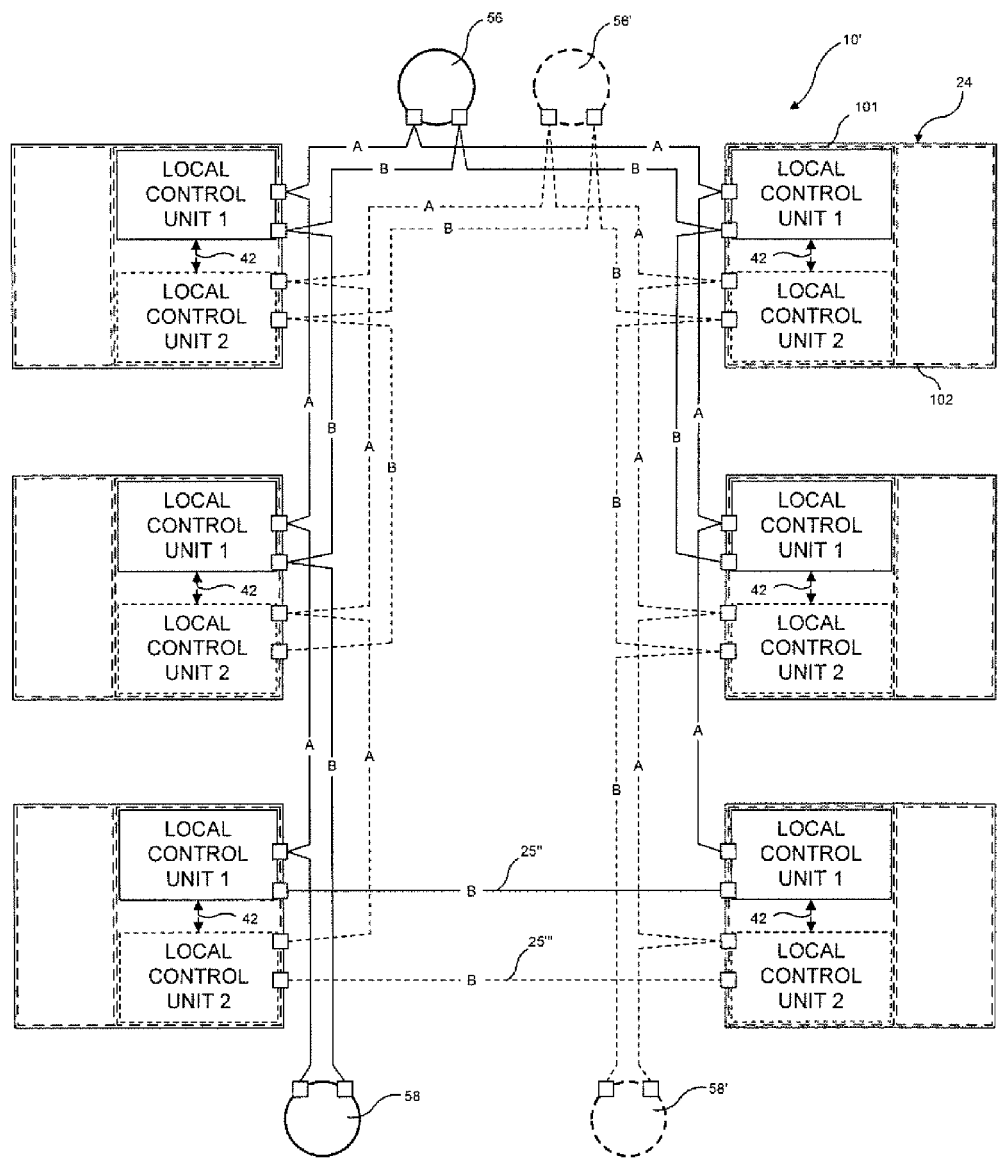
FIG. 4 is a block diagram illustrating an exemplary embodiment of a vehicle brake system incorporating dual controller wheel brake modules as shown in FIG. 3, and based upon a high communication capacity network, such as a FlexRay™ automotive communications protocol control network.

Referring now to FIG. 4, an exemplary embodiment of a vehicle brake system 10' incorporating dual controller wheel brake modules 24 as shown in FIG. 3, and employing a FlexRay™ automotive communications protocol control network is shown. Each of the modules 24 includes an electrical control part 101, having mode control modules 48, 48' and actuator control modules 50, 50', as shown in FIG. 3, and as described above, as well as an electromechanical actuation part 102, as shown in FIGS. 2A-2C, and as described above. It should be noted that in FIG. 4, solid lines are used to represent elements being supplied power from first power supply network 14, while dashed lines are used to represent elements being supplied power from second power supply network 14'.

Figure 5:
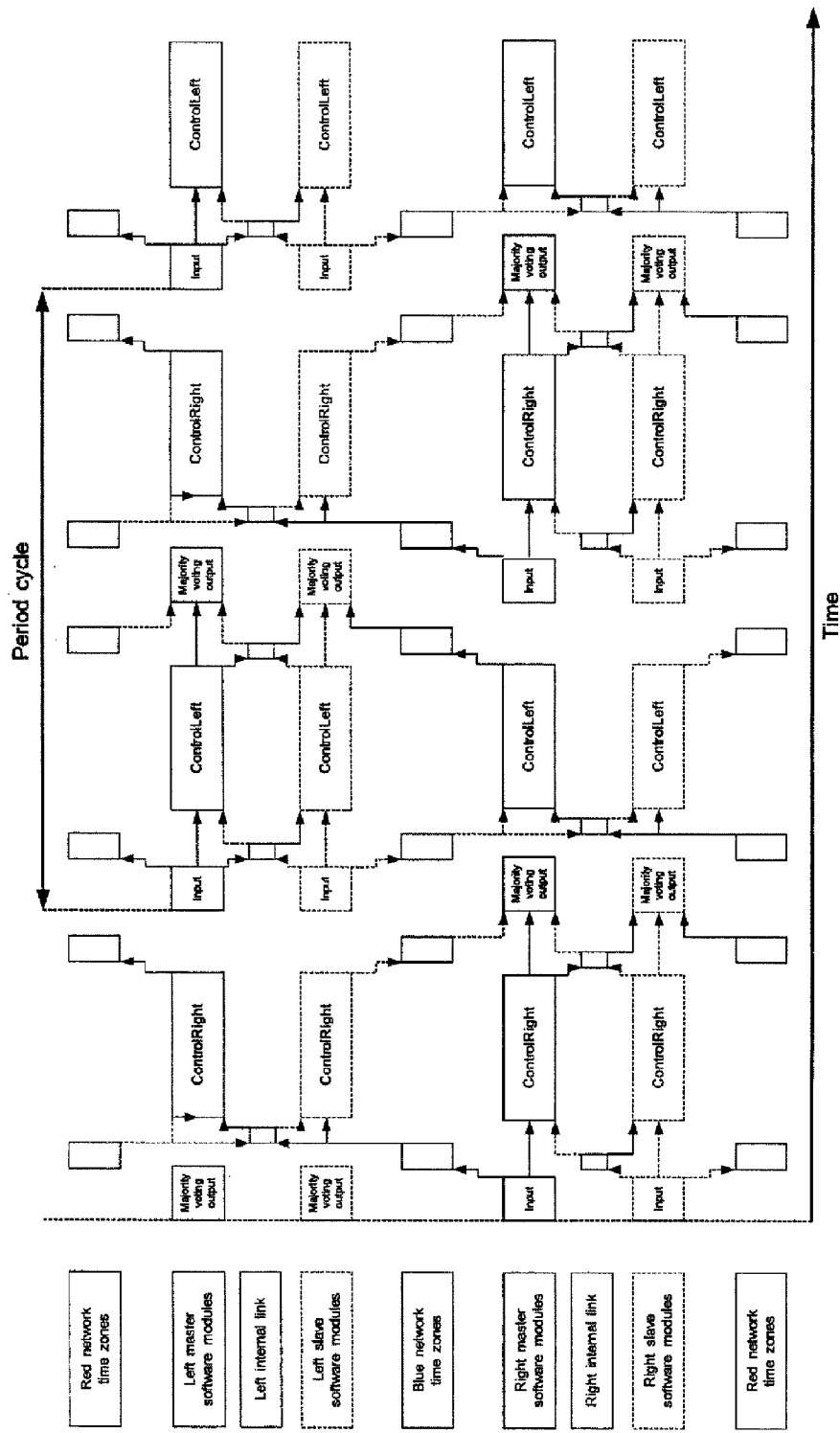
FIG. 5 is a time-based flowchart illustrating time sharing in a dual controller wheel module, as shown in FIG. 3, when a time division multiplexing technique is employed, such as may be employed by the FlexRay™ automotive communications protocol control network shown in FIG. 4.

System 10' builds upon a FlexRay™ automotive communications protocol network, with the basic principle being to employ a number of dually supplied dual controller wheel brake modules 24, each communicating via two pairs of communications channels (A and B). On each axle, a pair of dual control modules 24 acts as four synchronized control CPUs acting as a virtual axle module to perform the safety software in the brake unit with an at least triple redundancy and a triple majority decision for the output of the safety software. An example of the time sharing of the resources and information flow in such an axle block is shown in FIG. 5 and described below. Also, the vehicle brake control could be performed in the virtual axle module with the same high degree of redundancy. The vehicle brake control may be split into at least two tasks executed on different virtual axle modules communicating with each other over the network. As will be recognized, using such a configuration means that there is no need for separate ECUs for the vehicle brake control. System 10' also includes dually supplied gateways 56, 56' for connection to the vehicle information, such as a brake pedal and/or a vehicle control system, as well as dually supplied gateways 58, 58' for connection to a connected trailer.

It should be recognized that the physical network arrangement could be differently arranged depending of the type of vehicle. For example system 10' has different topologies for the second and third axle. More specifically, axle 3 has separate B-channels for the axle communication 25" and 25'" which increases the information exchange capacity of the axle network but also decreases the redundancy of the system network. At the first and second axles, axle communication (equivalent to 25" and 25'") takes place over the common A and B channels. The final topology is defined according the requirement of each vehicle type.

Figure 7:
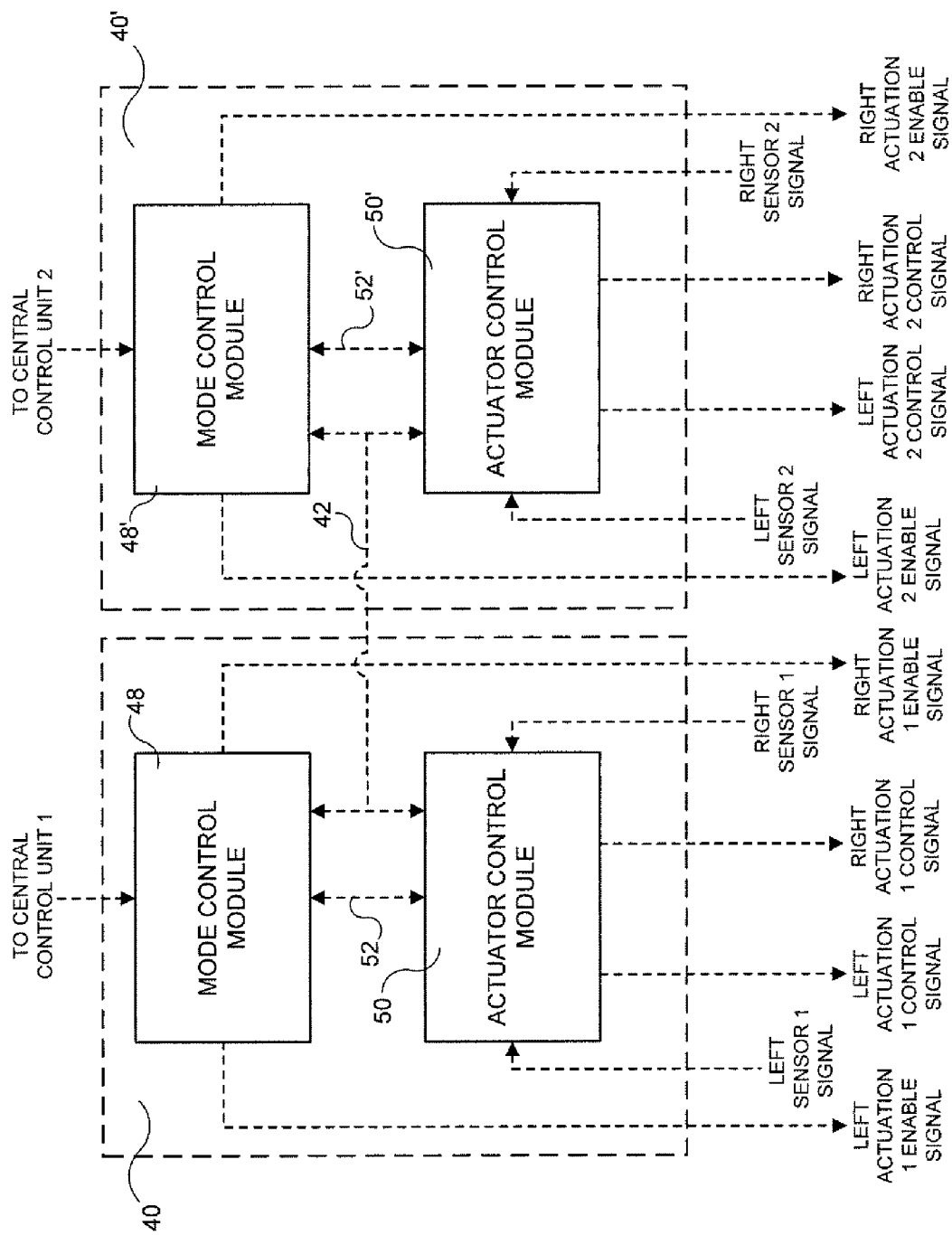
FIG. 7 is a block diagram illustrating exemplary communications to, from and within local control units forming part of the brake actuators shown in FIGS. 1 and 2A-2C similar to FIG. 3, but where control of the brake actuators is achieved on a per axle basis.
Figure 8:
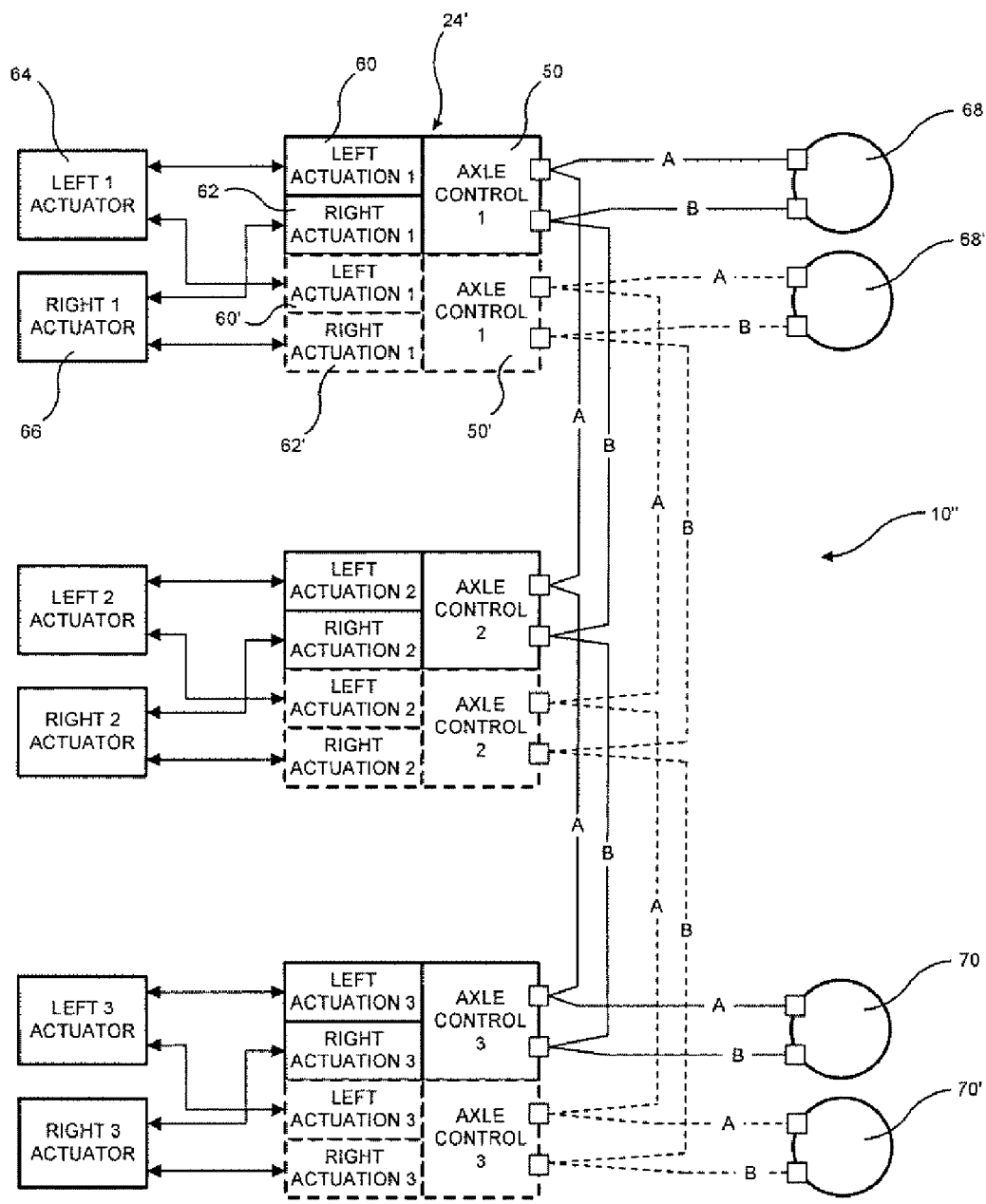
FIG. 8 is a block diagram illustrating an exemplary embodiment of a vehicle brake system incorporating dual controller axle brake modules as shown in FIG. 7, and employing a FlexRay™ automotive communications protocol control network.

Referring now to FIG. 5, a time schematic shows how the information exchange through an external and internal network could be arranged between two brake units according to FIG. 3 arranged in accordance with system 10' shown in FIG. 4 or axle units according to FIG. 7 arranged in accordance with system 10" shown in FIG. 8. It should be noted that one important feature of time division multiplexed based communication networks (e.g., FlexRay™ automotive communications protocol networks) is the possibility to synchronize the software execution in several units connected to the network. This synchronization feature allows physically separated modules to build a multi-processor block for a common task. In this example, two dual-controller brakes are communicating to verify the output to the actuation of the brake by a minimum of three results from calculations made in at least three separate controllers. Also, with a single failure of one of four modules on an axle there still could be a majority of three decision.

Figure 6:
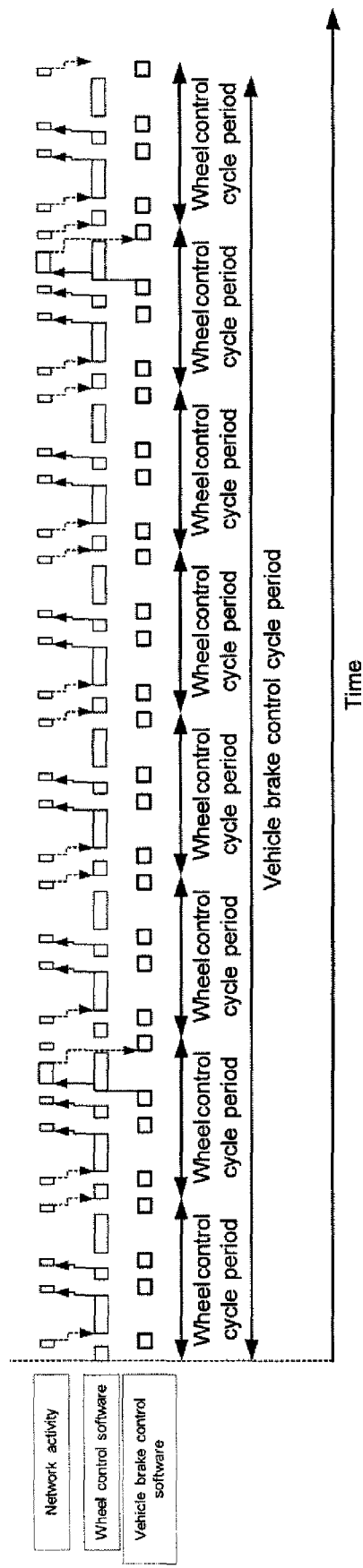
FIG. 6 is a time-based flowchart illustrating time sharing between a wheel control system and a brake control system, such as the brake control system shown in FIG. 9, when a time division multiplexing technique is employed, such as may be employed by the FlexRay™ automotive communications protocol control network shown in FIG. 9.
Figure 9:
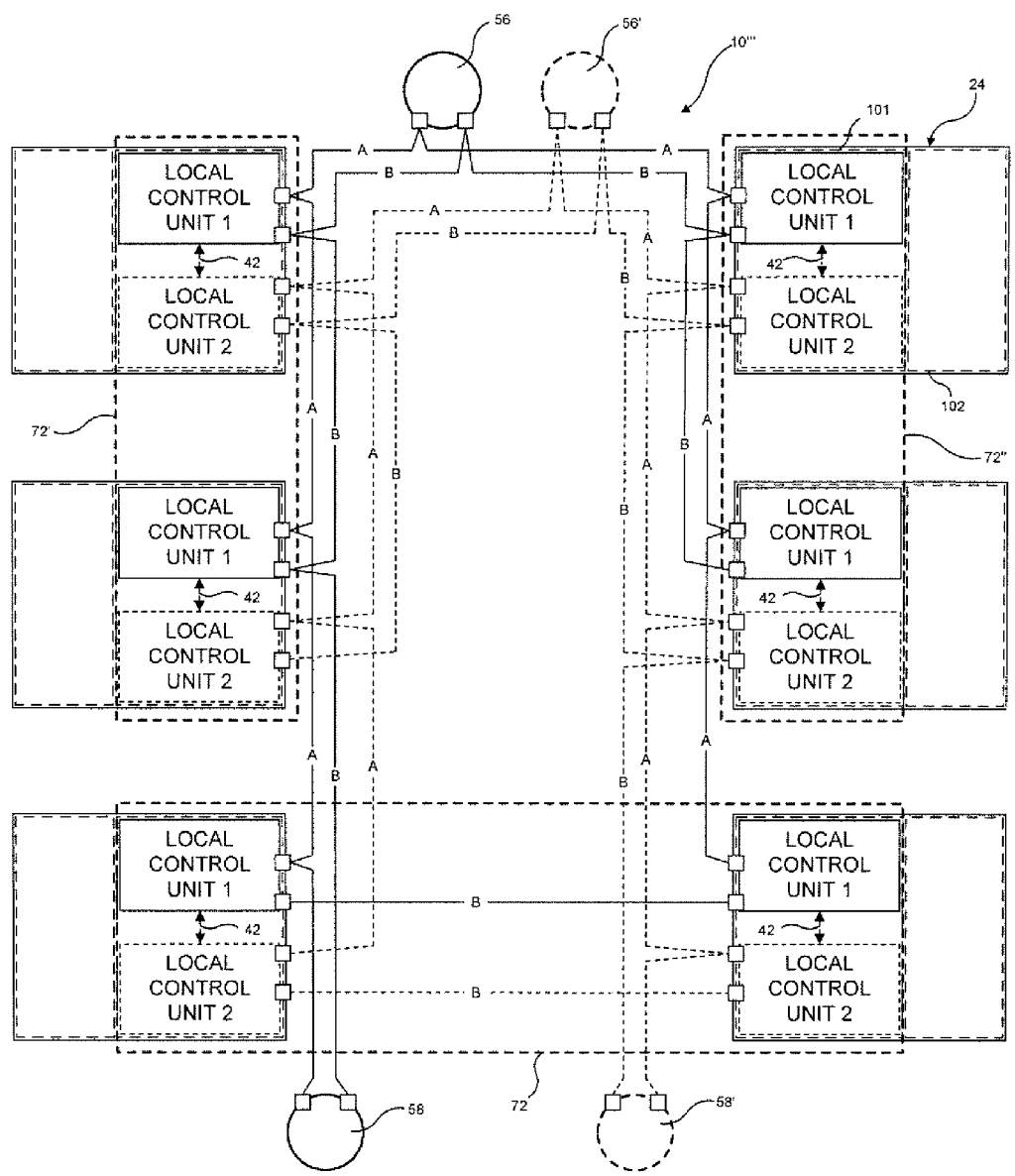
FIG. 9 is a block diagram illustrating an exemplary embodiment of a vehicle brake system incorporating dual controller wheel brake modules as shown in FIG. 3, and employing a FlexRay™ automotive communications protocol control network, similar to the embodiment shown in FIG. 4, but where central control functionality is provided by local control units acting together rather than by separate central control units.

Referring now to FIG. 6, a time-based flowchart illustrates time sharing between a wheel control system and a brake control system, such as the brake control system shown in FIG. 9, when a time division multiplexing technique is employed, such as may be employed by the FlexRay™ automotive communications protocol control network shown in FIG. 4, or by the control system shown in FIG. 8 with at least two axle control units forming the vehicle brake control system. The wheel control software is executed on a higher priority level than the vehicle brake control software, and the wheel control software is interrupting and halting the vehicle brake control software. In a dual core controller there could be one software task in each core. The vehicle brake control cycle period time is normally longer than the wheel control cycle period time, but the vehicle brake control cycle period time shall, if longer, be a multiple of the wheel control cycle period time. Both the wheel control and the vehicle brake control software uses the same redundancy method with at least a triple majority output voting, as described above. Also, the vehicle brake control could be split into several tasks where, for example, the first axle could be responsible for one task and the second axle for another task.

Referring now to FIG. 7, a block diagram illustrating exemplary communications to, from and within local control units 24' forming part of the brake actuators shown in FIGS. 1 and 2A-2C is shown. The communications are very similar to those shown in FIG. 3, with the exception that control of the brake actuator is achieved on a per axle basis. As such, actuator control modules 50, 50' each receive sensor signals from two sensors, and each transmits to actuation control signals (e.g., a left actuation control signal and a right actuation control signal).

An exemplary vehicle brake system 10" employing the axle brake modules 24 shown in FIG. 7 is shown in FIG. 8. Each of the axle control modules 24 includes two actuator control modules 50, 50', each having a left actuating power driver 60, 60' and a right actuating power driver 62, 62' for redundantly actuating, respectively a left actuator 64 and a right actuator 66. As is the case with FIG. 4, it should be noted that in FIG. 8, solid lines are used to represent elements being supplied power from first power supply network 14, while dashed lines are used to represent elements being supplied power from second power supply network 14'.

In a similar manner to system 10' shown in FIG. 4, system 10" builds upon a FlexRay™ automotive communications protocol communication network, with the basic principle being to employ a number of dually supplied dual controller axle brake modules 24', each communicating via two pairs of communications channels (A and B). Also in a similar manner to system 10' shown in FIG. 4, system 10" also includes dually supplied gateways 68, 68' for connection to the vehicle information, such as a brake pedal and/or a vehicle control system, as well as dually supplied gateways 70, 70' for connection to a connected trailer.

As mentioned above, the basic principle of system 10" is to employ a number of dually supplied dual controller axle brake modules 24'. On a dual axle vehicle, the pair of dual controllers act as four synchronized control CPUs acting as a virtual vehicle module to perform the safety software in the axle unit with an at east triple redundancy and a triple majority decision for the output of the safety software. An example of the time sharing of the resources and information flow in such an axle block is shown in FIG. 5 and described above. Also, the vehicle brake control could be performed in the virtual vehicle module with the same high degree of redundancy. As such, there is no need of separate ECUs for the vehicle brake control.

Referring now to FIG. 9, an exemplary vehicle brake system 10''' very similar to system 10' shown in FIG. 4 is illustrated. System 10''' differs from system 10' in that central control functionality, rather than being provided by separate central control units 18, 18', is performed by local control units 48, 48'. This eliminates the central control units 18, 18' as additional hardware in the system. In the embodiment shown in FIG. 9, there are some examples of how such a system 10''' can be configured. Each central control unit 72, 72', 72" takes the form of two or more (four each are illustrated) local control units 48, 48' that are communicating over two independent networks. The safety philosophy is based on data from at least three independent sources—if a failure occurs, data is available from at least two and the failure can be detected and a decision can be made from still correct data.

It should be recognized that while the systems 10, 10', 10", 10''' described above refer specifically to brake systems, these systems, as well as the distributed safety system modules, may be used to control various other types of vehicle systems, such as individual suspensions, wheel/axle steering, tire pressure control, etc.

The present invention, therefore, provides a system for controlling application of an electronically controlled brake which is well-suited for controlling the application of an electromechanical brake unit with self-energizing characteristics, which includes a redundant brake actuator for providing fail safe operation, which provides redundant communication with at least one central control unit and system sensors such that a functioning portion of the brake actuator is still in communication with these elements even during failure of another portion of the brake actuator, and which allows for a functioning portion of the brake actuator to provide at least a level of brake actuator control sufficient to avoid catastrophic consequences even during failure of another portion of the brake actuator.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A vehicle brake system comprising:
   a first power supply supplying electrical power to a first power supply network;
   a second power supply supplying electrical power to a second power supply network;
   a first central control unit in communication with a first control network, said first central control unit receiving electrical power from the first power supply network;
   a second central control unit in communication with a second control network, said second central control unit receiving electrical power from the second power supply network;
   a plurality of brake units, each of said plurality of brake units comprising:
   a brake component;
   a self-enforcing mechanism associated with and acting upon said brake component;
   a first actuation mechanism, said first actuation mechanism acting upon said self enforcing mechanism, in response to a first actuation control signal, to cause actuation of the brake component;
   a second actuation mechanism, said second actuation mechanism acting upon said self enforcing mechanism, in response to a second actuation control signal, to cause actuation of the brake component;
   a first local control unit in direct communication with said first central control unit via said first control network and receiving power from the first power supply network, said first local control unit in communication with said first actuation mechanism and transmitting the first actuation control signal to said first actuation mechanism, under certain circumstances, to cause actuation of the brake component; and a second local control unit in direct communication with said second central control unit via said second control network and receiving power from the second power supply network, said second local control unit in communication with said second actuation mechanism and transmitting the second actuation control signal to said second actuation mechanism, under certain circumstances, to cause actuation of the brake component;

wherein each first local control unit and each second local control unit comprises:

a mode control module that transmits an actuation enable signal which causes the actuation mechanism with which that control unit is in communication to be enabled; and an actuation control module that transmits an actuation control signal which causes the actuation mechanism with which that control unit is in communication to be actuated.

2. The vehicle brake system of claim 1 wherein said first actuation mechanism is supplied power by the first power supply network and said second actuation mechanism is supplied power by the second power supply network.

3. The vehicle brake system of claim 1 wherein each of said plurality of brake units further comprises:

a first sensor in communication with said first local control unit, said first sensor sensing at least one wheel parameter and supplying a signal indicative of the at least one wheel parameter to said first local control unit; and a second sensor in communication with said second local control unit, said second sensor sensing at least one wheel parameter and supplying a signal indicative of the at least one wheel parameter to said second local control unit.

4. The vehicle brake system of claim 3 wherein the at least one wheel parameter comprises at least one of position of a brake component, brake force, brake torque, pad wear, wheel speed, bearing temperature, torque and tire pressure.

5. The vehicle brake system of claim 1 wherein said first local control unit and said second local control unit of each of said plurality of brake units are in communication.

6. The vehicle brake system of claim 1 wherein at least one of said first local control unit and said second local control unit of at least one of said plurality of brake units is in communication with at least one of said first local control unit and said second local control unit of at least one other of said plurality of brake units.

7. The vehicle brake system of claim 1 wherein the first power supply network and the second power supply network are in communication via an isolation mechanism, the isolation mechanism preventing a failure in one of the first power supply network and the second power supply network from deleteriously affecting the other of the first power supply network and the second power supply network.

8. The vehicle brake system of claim 7 wherein the isolation mechanism comprises a fuse.

9. The vehicle brake system of claim 1 wherein said first local control unit and said second local control unit of each of said plurality of brake units are electrically, thermally and mechanically separated from one another so as to prevent a failure in one of said first local control unit and said second local control unit from deleteriously affecting the other of said first local control unit and said second local control unit.

10. The vehicle brake system of claim 1 wherein each actuation mechanism actuates only if it is receiving the actuation enable signal when it receives the actuation control signal.

11. The vehicle brake system of claim 1 wherein said first actuation mechanism comprises a first motor and said second actuation mechanism comprises a second motor.

12. The vehicle brake system of claim 1 wherein said first actuation mechanism comprises a first motor winding and said second actuation mechanism comprises a second motor winding, the first motor winding and the second motor winding acting on a common rotor and stator.

13. The vehicle brake system of claim 1 wherein said first actuation mechanism comprises a first motor and said second actuation mechanism comprises a second motor and a mechanical spring.

14. The vehicle brake system of claim 13 wherein the mechanical spring biases the brake component toward a released position, and wherein the brake component is moveable against the bias of the mechanical spring toward an applied position by the second motor.

15. The vehicle brake system of claim 13 wherein the mechanical spring biases the brake component toward an applied position, and wherein the brake component is moveable against the bias of the mechanical spring toward a released position by the second motor.

16. The vehicle brake system of claim 1 wherein said first control network and said second control network comprise time division multiplexed communications networks.

17. The vehicle brake system of claim 1 wherein said first control network and said second control network comprise automotive communications protocol networks.

18. The vehicle brake system of claim 1 wherein said first central control unit and said second central control unit each comprise a plurality of local control units communicating over two independent networks.

19. A brake unit for use in a vehicle brake system, said brake unit comprising:

a brake component;

a self-enforcing mechanism associated with and acting upon said brake component;

a first actuation mechanism, said first actuation mechanism acting upon said self enforcing mechanism, in response to a first actuation control signal, to cause actuation of the brake component;

a second actuation mechanism, said second actuation mechanism acting upon said self enforcing mechanism, in response to a second actuation control signal, to cause actuation of the brake component;

a first local control unit in communication with said first actuation mechanism and transmitting the first actuation control signal to said first actuation mechanism, under certain circumstances, to cause actuation of the brake component;

a second local control unit in communication with said second actuation mechanism and transmitting the second actuation control signal to said second actuation mechanism, under certain circumstances, to cause actuation of the brake component;

wherein said first actuation mechanism is operable, in the case of a failure, independently of said second actuation mechanism, to cause said brake component to be applied and to be released, in response to the first actuation control signal; and wherein said second actuation mechanism is operable, in the case of a failure, independently of said first actuation mechanism, to cause said brake component to be applied and to be released, in response to the second actuation control signal;

wherein each of said first local control unit and said second local control unit comprises:

a mode control module that transmits an actuation enable signal which causes said actuation mechanism with which that control unit is in communication to be enabled; and an actuation control module that transmits an actuation control signal which causes the actuation mechanism with which that control unit is in communication to be actuated.

20. The brake unit of claim 19 further comprising:

a first sensor in communication with said first local control unit, said first sensor sensing at least one wheel parameter and supplying a signal indicative of the at least one wheel parameter to said first local control unit; and a second sensor in communication with said second local control unit, said second sensor sensing at least one wheel parameter and supplying a signal indicative of the at least one wheel parameter to said second local control unit.

21. The brake unit of claim 20 wherein the at least one wheel parameter comprises at least one of position of a brake component, brake force, brake torque, pad wear, wheel speed, bearing temperature, torque and tire pressure.

22. The brake unit of claim 19 wherein said first local control unit and said second local control unit are in communication.

23. The brake unit of claim 19 wherein said first local control unit and said second local control unit are electrically, thermally and mechanically separated from one another so as to prevent a failure in one of said first local control unit and said second local control unit from deleteriously affecting the other of said first local control unit and said second local control unit.

24. The brake unit of claim 19 wherein each actuation mechanism actuates only if it is receiving the actuation enable signal when it receives the actuation control signal.

25. The brake unit of claim 19 wherein said first actuation mechanism comprises a first motor and said second actuation mechanism comprises a second motor.

26. The brake unit of claim 19 wherein said first actuation mechanism comprises a first motor winding and said second actuation mechanism comprises a second motor winding, the first motor winding and the second motor winding acting on a common rotor and stator.

27. The brake unit of claim 19 wherein said first actuation mechanism comprises a first motor and said second actuation mechanism comprises a second motor and a mechanical spring.

28. The brake unit of claim 27 wherein the mechanical spring biases the brake component toward a released position, and wherein the brake component is moveable against the bias of the mechanical spring toward an applied position by the second motor.

29. The brake unit of claim 27 wherein the mechanical spring biases the brake component toward an applied position, and wherein the brake component is moveable against the bias of the mechanical spring toward a released position by the second motor.

30. The vehicle brake system of claim 19 wherein said first control network and said second control network comprise time division multiplexed communications networks.

31. The vehicle brake system of claim 19 wherein said first control network and said second control network comprise automotive communications protocol networks.

* * * * *